United States Patent
Zaks et al.

Patent Number: 5,137,743
Date of Patent: Aug. 11, 1992

[54] FOODS HAVING AN OIL PHASE THICKENED WITH AN OIL SOLUBLE POLYESTER

[75] Inventors: Aleksey Zaks, Brookline; Robert D. Feeney, Scituate; Akiva Gross, Newton, all of Mass.

[73] Assignee: Opta Food Ingredients, Inc., Cambridge, Mass.

[21] Appl. No.: 579,482

[22] Filed: Sep. 7, 1990

[51] Int. Cl.$^5$ .............................................. A23D 7/00
[52] U.S. Cl. ................................. 426/602; 426/417; 426/603; 106/244; 524/322; 523/511
[58] Field of Search .................... 426/602, 573, 417; 106/244; 524/322; 523/511

[56] References Cited

U.S. PATENT DOCUMENTS

| | | | |
|---|---|---|---|
| 2,072,068 | 2/1937 | Ellis | 526/604 |
| 2,376,823 | 5/1945 | Scrutchfield | 527/604 |
| 3,227,559 | 1/1966 | Radlove | 426/417 |
| 3,563,767 | 2/1971 | Wasserman et al. | 99/123 |
| 3,600,186 | 8/1971 | Mattson et al. | 99/1 |
| 3,876,794 | 4/1975 | Rennhard | 426/601 |
| 3,966,632 | 6/1976 | Collipoulos et al. | 426/244 |
| 4,098,913 | 7/1978 | Baugher | 426/104 |
| 4,103,038 | 7/1978 | Roberts | 426/601 |
| 4,284,655 | 8/1981 | Miller et al. | 426/602 |
| 4,508,746 | 4/1985 | Hamm | 426/601 |
| 4,626,443 | 12/1986 | Takahashi et al. | 426/602 |
| 4,839,192 | 6/1989 | Sagi et al. | 426/607 |
| 4,840,815 | 6/1989 | Meyer et al. | 426/611 |
| 4,849,243 | 7/1989 | Screenivasan et al. | 426/602 |
| 4,948,617 | 8/1990 | Dartey et al. | 426/602 |

FOREIGN PATENT DOCUMENTS

| | | |
|---|---|---|
| 1220488 | 1/1971 | United Kingdom . |
| 1371792 | 10/1974 | United Kingdom . |
| 2178752A | 2/1987 | United Kingdom . |
| 2205726A | 12/1988 | United Kingdom . |

*Primary Examiner*—Jeanette Hunter
*Assistant Examiner*—Helen Pratt
*Attorney, Agent, or Firm*—Hamilton, Brook, Smith & Reynolds

[57] ABSTRACT

Texturized oils and oil-continuous emulsions are prepared by combining liquid oils with edible polyester polymers. The resulting texturized oils and emulsions are gelled substances having a fat-like consistency which approximates the viscoelastic properties of solid fats, such as butter, margarine or hydrogenated vegetable oils, but contain no saturated fats. These texturized oils and emulsions can be used as a substitute for solid fats in food products and to make high-quality spreads containing reduced amounts of saturated fat.

22 Claims, 3 Drawing Sheets

FOODS HAVING AN OIL PHASE THICKENED WITH AN OIL SOLUBLE POLYESTER

BACKGROUND

Fat is an important part of the diet of all individuals. It serves as a source of energy and essential fatty acids, and also as a carrier for fat-soluble vitamins. In addition, due to its unique functional properties, fat is often used to improve the overall quality of foods including color texture, structure, flavor, mouthfeel and other characteristics.

However, both the total desirable amount of fat and types of fat in the diets of individuals have been a subject of controversy. A number of investigations revealed a correlation between high consumption of fats and increased rates of atherosclerosis, coronary artery disease and obesity. As a result, several organizations, including the American Heart Association, U.S. Department of Agriculture and Department of Health, have recommended the reduction of total fat intake in general and of saturated fat in particular.

The nutritional and biological effects of fatty acids are diverse. As long as 30 years ago, it was observed that diets composed predominantly of saturated fatty acids increased plasma lipids, whereas diets containing polyunsaturated fats decreased plasma lipids. More recent findings indicate that even monounsaturated fatty acids, such as oleic acid can be hypolipidemic. F. H. Mattson and S. M. Grundy *J. Lipid Res.*, 26:194 (1985). It is now well accepted that not only the total amount of fat, but also the composition of dietary fat which is consumed affects the incidence of coronary arterial disease.

The relative proportion of saturated to unsaturated fats consumed in the U.S has changed significantly. The consumption of fats derived from vegetable oils that are rich in unsaturated fatty acids has more than doubled in the last 50 years. R. L. Rizek. et al., *In Dietary Fats and Health*, E. G. Health and W. J. Vesek, (eds.) American Oil Chemists' Society Champaign, Il., p. 17 (1983). However, in a number of food products, the complete substitution of saturated fats with unsaturated fats is often problematic. The functional properties of fats in different foods are determined by a number of parameters, including the balance between solid and liquid phases and the structure of the fat crystal.

Fats can crystallize in different crystal forms. The consistency, plasticity, graininess, and other physical properties of many products such as butter lard, margarine, shortenings, and cocoa butter, all depend on a particular polymorphic form of the triglyceride present. As a result, only a certain part of solid saturated fat can be substituted with liquid unsaturated oils without sacrificing the sensory quality of the product.

An alternative material that can mimic the physical and structural properties of saturated fats without having unfavorable nutritional qualities would be valuable for reducing the amount of saturated fat in a food product without sacrificing the sensory quality of the food product.

SUMMARY OF THE INVENTION

The invention relates to an oil or fat which contains a polymeric, fat-soluble material and its use for the modification of the physical properties of fats. The polymeric material which can be used in the present invention includes oil soluble polymers, such as alkyd-type polyesters, polymers based on hydroxyacids and natural polymers, such as cutin. Alkyd-type polyesters are particularly useful in the present invention.

The polymers are used in fat formulations wherein all or a portion of the fat is substituted by a mixture or an emulsion containing a liquid fat and the polymer. In one embodiment, alkyd polyester polymers are used as texturing agents for oils. The polymer is added to neat oils and changes the physical characteristics of the oils, such as the melting point and viscosity. Liquid oils composed of mostly unsaturated fatty acids solidify at room temperature in the presence of even small amounts of the polymer.

The polymer also helps to stabilize and solidify emulsions. In this embodiment, the polymer is incorporated into an oil-in-water or water-in-oil emulsion, forming a material having the physical and structural characteristics of saturated fat but which contains no saturated fat.

The present oils or emulsions treated with the oil-soluble polymers can be used to reduce the amount of saturated fat in foods. Use of the present treated oils or emulsions allows all or part of the saturated fat in a food to be replaced by unsaturated oils while still retaining desirable sensory or physical qualities of the food product.

DETAILED DESCRIPTION OF THE INVENTION

Figure 1:
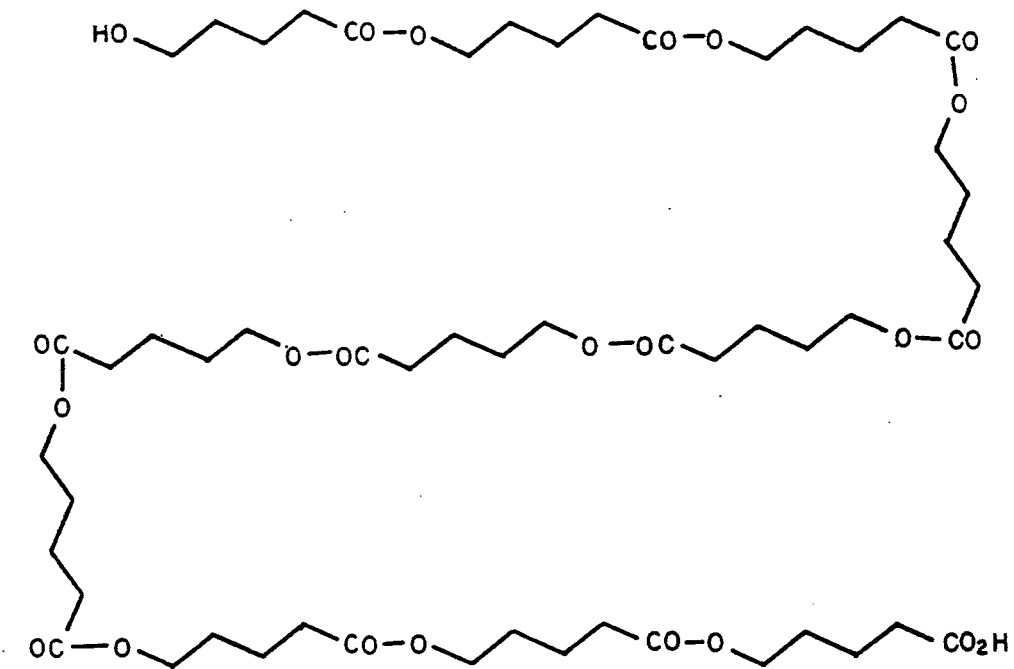
FIG. 1 is a schematic representation of a polymer product made by the polycondensation of hydroxyacids.

Polymers useful in the present invention are oil-soluble polymers which when added to a liquid oil or fat, cause a change in the textural properties of the oil or fat. Polymers suitable for this purpose, for example, include natural polymers, such as cutin polymers based on hydroxy acids and polymers prepared by the condensation of polyhydric alcohols and polybasic acids. Polymers which are particularly useful are members of the class of polymers generally known as "alkyd" polymers.

Alkyd polymers are characterized in that they are generally prepared by reaction of a polyhydric alcohol, a polybasic acid and a fatty acid or an oil, usually in its monoglyceride form. Alkyd polymers can be prepared by any one of several known methods. For example alkyd-type polymers were prepared by Van Bemmelen in 1856 by condensing succinic anhydride with glycerol. Van Bemmelen, *J. Prakt. Chem.*, 69:84 (1856) In the so called Fatty Acid method, a fatty acid, a polyol and an anhydride are mixed together and allowed to react. The Fatty Acid Monoglyceride method includes a first step of esterifying the fatty acid with glycerol and when the first reaction is complete, adding an acid anhydride. The reaction mixture is then heated and the polymerization reaction takes place. In the Oil Monoglyceride Method an oil is reacted with glycerol to form a mixture of mono, di, and triglycerides. This mixture is then polymerized by reacting with an acid anhydride. B. Parkyn, F. Lamb and B. V. Clifton *Polyesters* (1967), Iliffe Books, London, Vol. 2; T. C. Patton, *In: Alkyd Resins Technology,* Wiley-Interscience New York (1962). Alkyd polymers made by these and other methods can be used in the present invention.

Glycerol is a commonly used polyhydric alcohol due to its abundance and cost. In addition to glycerol, a number of other polyols such as glycols, polyglycerols, polyglycerol esters, sugars and sugar alcohols can be used as starting materials for producing the present edible polymers. Monoglycerides, which contain reactive hydroxy groups and a fatty acid are particularly useful starting materials.

Polybasic acids which can be used include natural edible multifunctional carboxylic acids, such as, for example, citric succinic, malic, fumaric, maleic or adipic acid, or the corresponding anhydrides. A variety of fatty acids can be used in preparing the present alkyd polymers, for example, fatty acids which generally occur in vegetable or fish oils.

The composition molecular weight, and viscoelastic properties of the resulting polymers depends on the choice of starting materials and on the synthetic method used. For example, the number of reactive hydroxy groups on the polyhydric alcohol will affect the properties of the polymer. In general, the greater the number of reactive hydroxy groups, the more viscous, less soluble, harder and less flexible the polymer becomes. The glycols, for example, which have two reactive hydroxy groups, produce only straight chain, linear polymers, which are soft and flexible. Glycerol has three reactive hydroxy groups, thus, reaction with a single molecule of dibasic acid leaves one reactive hydroxyl, which is available for cross-linking, and a three-dimensional network develops. Polyhydric alcohols having more than three reactive hydroxy groups would tend to form an even tighter cross-linked network. In many alkyd polymers which are based on glycerol, for example, one hydroxyl group will be reacted with a fatty acid, and the other two will form the ester linkages with the acid. Thus, the properties of an alkyd polyester can also be modified by the choice of fatty acid which is used.

The choice of the polybasic acid also affects the properties of the polymer. Dicarboxylic acids or anhydrides are generally used to form the present polyester polymers. However, triacids can be used, which result in a polymer containing a free carboxyl group, which can be crosslinked or be derivatized to impart desired properties to the polymer.

Finally, alkyd resins can be terminated using monohydric alcohols (e.g.. diglycerides) or monobasic acids (e.g.. fatty acids). The choice of the terminal groups will depend in part on the properties of the polymer. For example long-chain fatty acids are used where increased oil solubility is desired.

Figure 2:
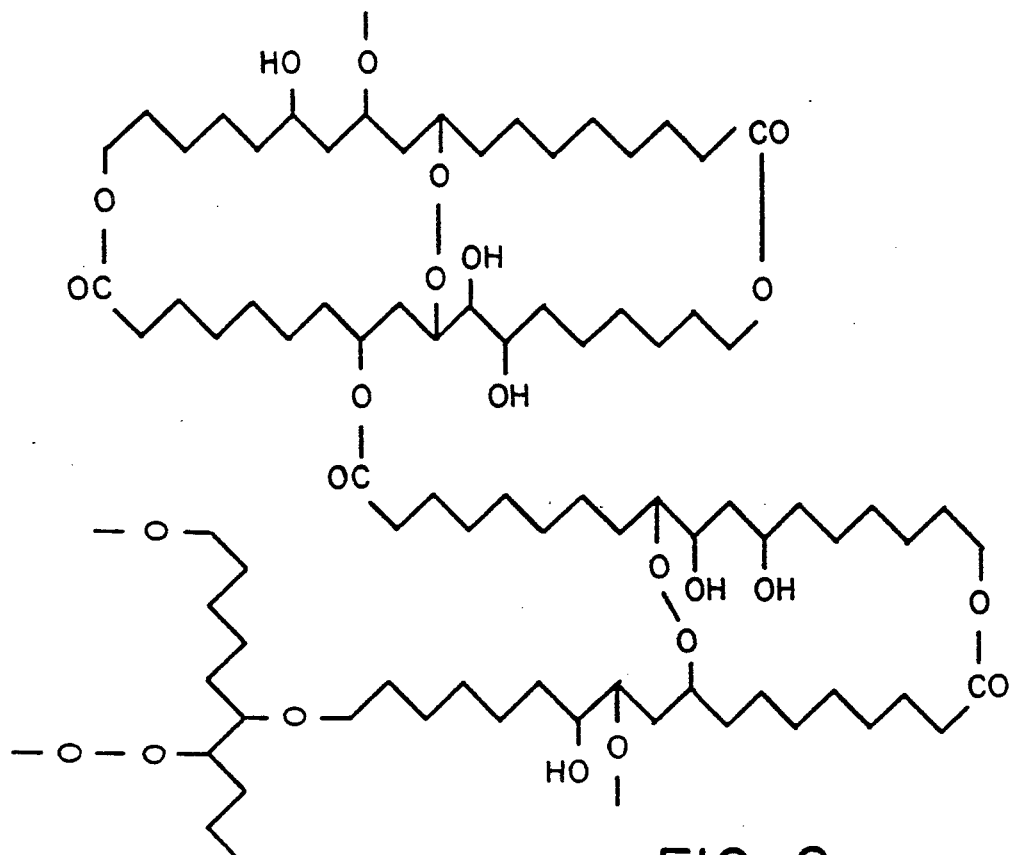
FIG. 2 is a schematic representation of the structure of cutin.

The polymers useful in the present invention can also be made from other starting materials which result in the formation of ester bonds. For example, the condensation of hydroxyacids, such as gluconic acid, glucoheptonic acid or ω-hydroxy fatty acids with themselves or with the appropriate polyfunctional molecule for forming polyesters, can result in the desired oil-soluble polymers. A polymer prepared by the polycondensation of hydroxyacids is shown schematically in FIG. 1. Cutin, a naturally occurring polymer of this type is shown in FIG. 2.

Figure 3:
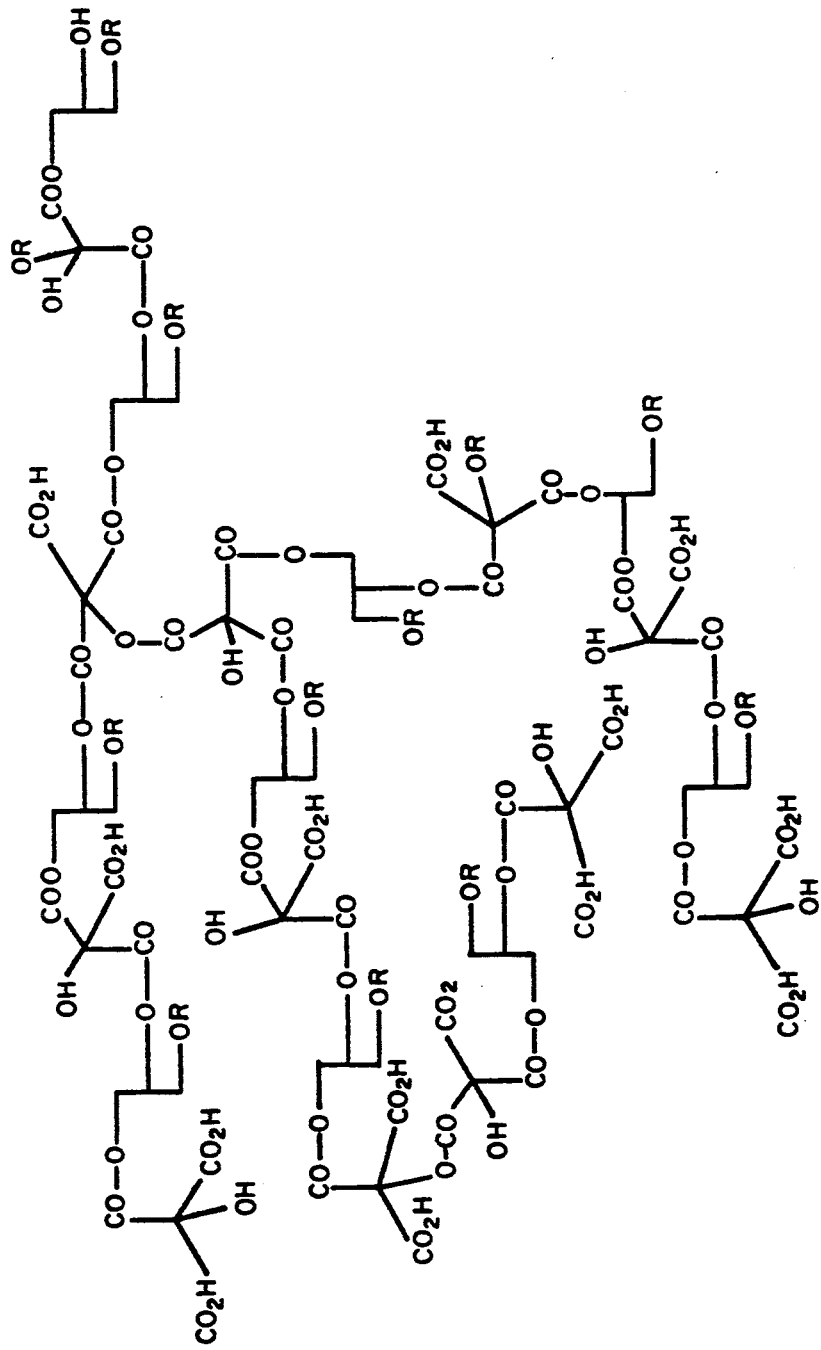
FIG. 3 is a schematic representation of a polymer formed by a polycondensation reaction between citric acid and 1-monoglycerides.
Figure 4:
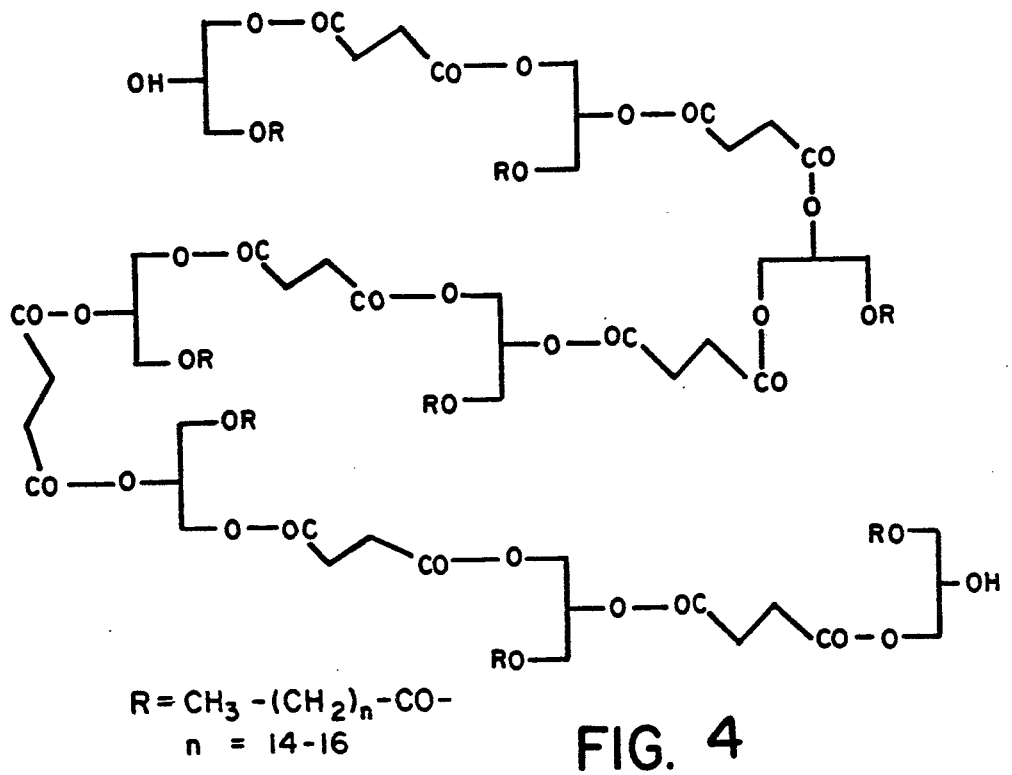
FIG. 4 is a schematic representation of a polymer formed by a polycondensation reaction between succinic anhydride and 1-monoglycerides.
Figure 5:
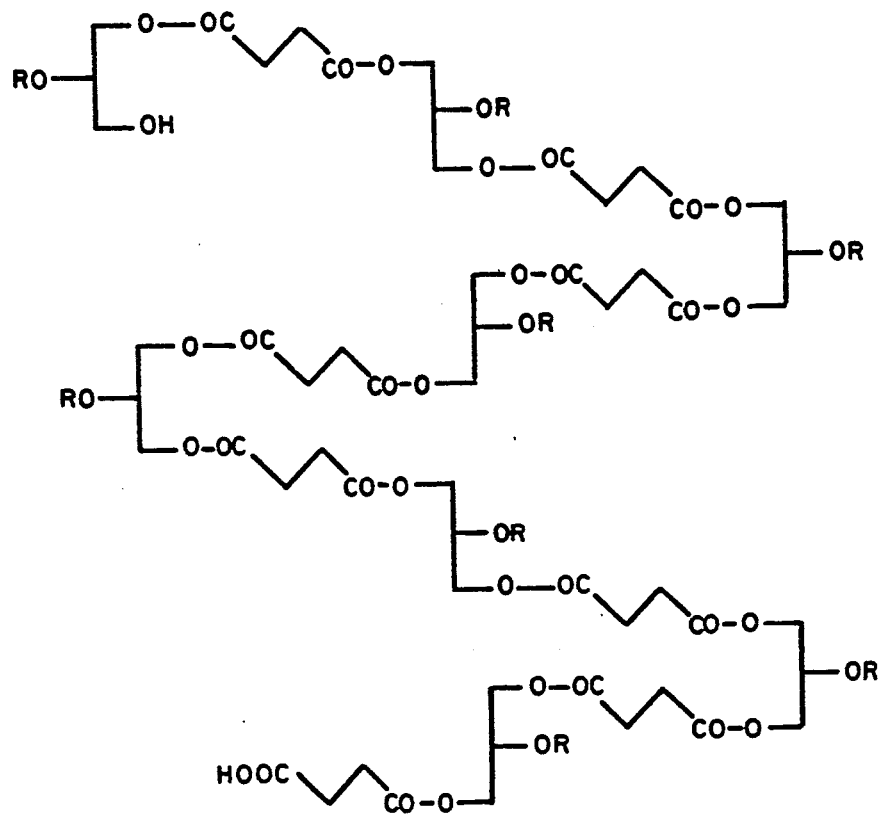
FIG. 5 is a schematic representation of a polymer formed by a polycondensation reaction between succinic anhydride and 2-monoglycerides.

Alkyd-type polyesters formed by the reaction of natural dicarboxylic acids and monoglycerides are preferred. Natural dicarboxylic acids which are preferred include citric acid, succinic acid, malic acid, fumaric acid, maleic acid and adipic acid. The corresponding anhydrides can be used in place of the diacids. Preferred monoglycerides are monoglycerides derived from natural vegetable oils such as sunflower oil, safflower oil, soybean oil, canola oil, olive oil, peanut oil, and corn oil. An alkyd-type polymer prepared by the condensation of citric acid and 1-monoglycerides is shown schematically in FIG. 3. An alkyd-type polymer formed by the condensation of succinic anhydride and 1-monoglycerides is shown schematically in FIG. 4. An alkyd-type polymer formed by a condensation reaction between succinic anhydride and 2-monoglycerides is shown schematically in FIG. 5. Polymers having a molecular weight of at least 2000 daltons are particularly useful.

Alkyd-type polyesters are widely used by the coating industry in a variety of products including resins, enamels, varnishes and paints. In relation to food products, they are used as coatings for food containers, for deodorizing coating paper, and for corrosion protection in the meat and dairy industries.

The unique feature of alkyd polymers is that their presence in liquid oils, even in small amounts, changes the viscoelastic properties of the oil significantly. It has been discovered, for example, that the presence of about 5% by weight of a polyester formed by the condensation of monoglycerides and citric acid, causes a liquid oil to thicken or gell. The viscoelastic properties of the resulting thickened or gelled mixture resemble that of partially hydrogenated fats.

Thickened or gelled mixtures made from liquid oils which have been treated with oil-soluble polymers can be used as a substitute for partly or fully hydrogenated fats in food products. Liquid oils, such as sunflower oil, safflower oil, soybean oil, canola oil, olive oil, peanut oil or corn oil are mixed with an amount of the polymer sufficient to thicken or texturize the oil so that it has the desired textural properties. The term "texturize" as used herein means that desired characteristics such as viscosity, melting point, structure or plasticity, are imparted to the material. Most liquid oils gell, for example, in the presence of from about 2 to about 10% (by weight) of the polymer. The polymer can also be added to saturated or partially saturated fats such as hydrogenated (or partially hydrogenated) vegetable oil, butter fat or cocoa butter, to produce a fat-like mixture having a reduced level of saturated fat. The viscoelastic properties of the resulting mixture resembles those of partially hydrogenated fats. The thickened oils can be used as substitutes for solid fat in the production of baked goods.

The modified oil materials formed from the mixture of the polymer and the liquid oil demonstrate extremely useful melting properties; for example, they have a melting point range of about 37–40° C. which approximates body temperature. In food products, particularly those based on fatty materials, such as margarines, spreads or confections, a clean and rapid mouthmelt is desired. This rapid mouthmelt is characteristic of cocoa butter, which is a standard for blends incorporating saturated and unsaturated fats. The present invention can achieve the mouthmelt standard of cocoa butter without the use of solid, saturated fats.

Products that currently contain added solid fats include, for example, spreads, margarines, baked goods, frostings, chocolate and ice creams. The amount of saturated fat in these and other fat-containing foods can be reduced significantly by replacing all or part of the saturated fat with gelled oils made by the present method.

In one embodiment of the present invention, baked goods made with liquid oil stock and no structural fats are produced. In this embodiment, the hydrogenated or partly hydrogenated fats are substituted with the present modified oils consisting of mixtures of liquid unsaturated oils with oil-soluble polymers. In this method, liquid oils are thickened or texturized by adding an amount of the oil-soluble polymer sufficient to cause the oil to thicken to the desired degree, as described above. The thickened or gelled oils are used in place of some or all of the hydrogenated or partially hydrogenated fat in the recipe.

Solid fats (e.g., butter margarine, shortening) are used in baking applications for a number of reasons. In stabilized-foam products such as cakes breads, and other baked goods, for example, solid fats affect the batter viscosity, cell volume, cool texture and finished height of the product. In simple non-leavened food systems, such as flaky pie crust the solid fat contributes significantly to dough lamella formation and subsequent flaky texture. The same results can be obtained if all or a portion of solid fat is replaced with a texturized oil of the present invention.

In another embodiment of the present invention, high quality, low-fat spread emulsions made with liquid oil stock and containing no saturated fats can be produced.

An unexpected observation was made that oil-soluble polymers can act as powerful emulsifiers and stabilize emulsions. The polymers stabilize the emulsions and change their melting properties. For example, a 1:1 mixture of water and liquid vegetable oil in the presence of about 3% of an oil-soluble polymer (e.g., succinic acid/monoglyceride polyester) forms a stable, unpourable emulsion. Low-fat spreadable emulsions, of either the water-in-oil or oil-in-water type can be made, for example, using liquid oils which have been treated with a small amount of the polymers. Oil continuous emulsions containing from about 20 to about 80% by weight oil which exhibit the desired type, viscoelastic and textural qualities, i.e., those analogous to solid fats can be produced by this method.

Key to the proper textural development of the spreadable emulsions is the combined action of the aqueous and oil gelling agents present in the mixture. The polymer is used as the gelling agent of the oil phase, while a standard aqueous gelling agent is used in the aqueous phase. Aqueous gelling agents which can be used include, for example, gelatin, xanthan gum, gum arabic, guar gum, pectin, algin carrageenen and cellulose derivatives. The oil phase comprises an oil which is liquid at room temperature having any desired degree of unsaturation, such as, but not limited to, olive, corn sunflower, sufflower, soybean or canola oil. "Winterized" liquid oils, which are oils which resist crystallization at low temperatures, e.g., below 40° F., are preferred. The oil phase also includes the polymer, and, optionally, oil-soluble emulsifier(s), colors, and flavors. The aqueous phase contains water and the aqueous gelling agent; and can optionally contain salts, milk solids and flavors.

The emulsions generally contain from about 30 to 80% by weight of the oil phase, and about 20 to 70% by weight of the aqueous phase. The oil phase contains from about 1 to 10% by weight of the polymer, and the aqueous phase contains from about 1 to 8% by weight of the aqueous-soluble gelling agent.

The emulsion is made according to the following general procedure. The polyester polymer is dispersed in the oil phase and heated to a temperature of from about 40 to about 100° C., after which optional ingredients, such as flavors, colors and emulsifiers are added.

The aqueous phase is prepared by heating the water to a temperature of from about 50 to about 90° C. and adding the gelling agent (or following the suitable procedure for the particular gelling agent), after dissolution of which the optional ingredients, if any, are added. The entire aqueous phase is normally heated to a temperature of from about 60 to about 90° C. for a short time to effect pasteurization. The aqueous phase is allowed to cool to no lower than approximately 50° C., and is mixed with the oil phase under conditions appropriate to form the emulsion.

The emulsion is assembled under shear, using a high speed mixture or homogenizer. In this process, the oil phase is agitated under shear in the receiving vessel and the aqueous phase is slowly added forming an emulsion of the aqueous phase in a continuous external oil phase. When the emulsification is complete, the vessel is placed in a chilled bath, about 0° C, and the homogenizer speed is reduced. The vessel is spun and the sides of the vessel are scraped to remove and distribute any cooled or crystallized material. The procedure is continued until the emulsion is plasticized, that is until it displays a measurable yield point or until further cooling and mixing is difficult due to the system viscosity.

It is during the scraped surface heat exchange process described above that the polymer in the continuous oil phase thickens the oil to a gelled state. Gelling of the aqueous phase inhibits the mobility of the water by drastically increasing the viscosity of the water phase due to the gelation process. The viscosity of the resulting emulsion at the point of removal from the process apparatus approximates that of a softened butter. The texture of the emulsion (i.e., hardness) gradually increases with refrigerated storage, and until it approximates that of soft spread products currently on the market.

The present invention allows products having characteristics associated with solid fat to be made which completely lack solid fats. Solid fats are saturated or partially saturated fats which form a structure or crystalline network which lends texture and stability to conventional margarines and spread products. In general, attempts at making spread emulsions without a small percentage of added structural fat result in a failed or unstable emulsion. The present method results in a stable emulsion containing no structural solid fat.

The invention will now be illustrated by the following Examples.

EXEMPLIFICATION

EXAMPLE 1

Thirty one grams (31 g) of monoglycerides derived from hydrogenated vegetable oil (Myverol 18-06, Kodak, Eastman Chemicals Division, Kingsport, TN) were placed in a round-bottom 100 mL flask and melted at 140° C. Ten grams of citric acid monohydrate (Sigma Chemical Company, St. Louis, MO) were then added under stirring. The above weight ratio resulted in 1/1.75 molar ratio of citric acid to monoglycerides. Vacuum was applied (6-10 mm Hg) and the temperature was raised to 180° C. After 30 min 200 mg of p-toluenesulfonic acid catalyst were added and the reaction mixture was stirred at 180° C. and under vacuum for another 22 hours, forming a citrate polymer.

The polymer was cooled to room temperature, homogenized to a powdered state and thoroughly washed with methanol to remove the catalyst. The molecular weight of the resulting polymer (determined by GPC with different MW polystyrenes as standards) was found to be around 9,000. The product melting properties were determined by differential scanning calorimetry (DSC).

The melting point was found to be about 49-51° C. Analysis of a 5% (by weight) solution of the polymer in canola oil revealed an endothermic peak at 40° C. with an enthalpy of 2.1 Joules/gram (J/g).

The resulting citric acid polymer was then used to prepare a high quality fat spread emulsion using liquid oil stock, without adding structural or saturated fat. The emulsion consisted of an aqueous phase, including salts, gelling agent milk solids and flavors, and an oil phase, which included the polymer, emulsifier(s), color and flavor.

In the formulation, the following components were used to assemble the final emulsion:

|  | % in Final Product |
|---|---|
| OIL PHASE | |
| Canola oil (Procter & Gamble Co.) | 37.4 |
| Dimodan-O emulsifier (Grindsted Co.) | 0.5 |
| Citric acid polymer | 2.0 |
| Color (1% soln Beta carotene) | 0.05 |
| Flavor (Givaudan F-9093) | 0.05 |
| Total | 40% |
| MILK PHASE | |
| Water | 55.48 |
| Salt | 1.0 |
| Milk Solids (Carnation Co.) | 1.0 |
| Gelatin (Hormel, 250 Bloom) | 2.5 |
| Flavor, cream; (Quest, Inc.) | 0.01 |
| Flavor, butter; (Chris Hansen Labs) | 0.01 |
| Total | 60% |

The polymer was dispersed in the oil phase and heated to 100° C. after which the flavor, color and emulsifier were added. The aqueous phase was prepared by heating the water to 70° C. and dispersing the gelling agent. The the remaining ingredients were added. The entire aqueous phase was heated to 80° C. for a short time to effect pasteurization. The aqueous phase was allowed to cool to 50° C. and mixed with the oil phase.

The emulsion was assembled under shear, using a polytron homogenizer. With the oil phase undergoing shear in the receiving vessel, the aqueous phase was slowly added, forming a continuous external oil phase. Care was taken to avoid the inclusion of air in the emulsion. When the emulsification was complete, the vessel was placed in a chilled bath, at 0° C., with the homogenizer speed reduced. The vessel was spun and the sides of the vessel were scraped to remove and distribute the cooled or crystallized material. The procedure was continued until further cooling and mixing by this method was impossible due to the system viscosity. The viscosity of the product at the point of removal from the process apparatus was that of a softened butter. The emulsion was placed in a refrigerator at 4° C. and the hardness gradually increased with refrigerated storage, and until it approximated that of a soft spread product e.g., margarine.

EXAMPLE 2

Twenty grams (20 g) of monoglycerides derived from hydrogenated vegetable oil (Myverol 18-06, Kodak) were placed in a round-bottom 100 mL flask and melted at 140° C. Succinic anhydride (5.3 g; Sigma) was then added under stirring. The above weight ratio resulted a 1:1 molar ratio of succinic anhydride to monoglycerides. The temperature was raised to 200° C. and the reaction mixture was stirred at this temperature for 24 hours, forming a succinylated polymer.

The polymer was cooled to room temperature and homogenized to form a powder. The molecular weight of the resulting polymer as determined by GPC was around 8,900. The product melting properties were then determined by DSC. The product melted at 50° C. DSC scan of a 5% (by weight) solution of the polymer in canola oil revealed an endothermic peak at 39° C. with an enthalpy of 2.0 J/g.

The polymer was then used to prepare fat spread emulsions with liquid oil and no structural or saturated fat. In the formulation, the following components were used to assemble the final emulsion:

|  | % in Final Product |
|---|---|
| OIL PHASE | |
| Canola oil | 46.6 |
| Dimodan-O emulsifier | 0.5 |
| Succinic acid polymer | 2.5 |
| Refined Lecithin (Nattermann Phospholipid, Inc.) | 0.2 |
| Color (1% soln. Beta-carotene) | 0.05 |
| Flavor (Givaudan F-9093) | 0.15 |
| Total | 50% |
| MILK PHASE | |
| Water | 44.96 |
| Salt | 1.5 |
| Milk Solids (Carnation Co.) | 1.0 |
| gelatin | 2.5 |
| flavor, cream; (Quest, Inc.) | 0.02 |
| Flavor, butter; (Chris Hansen Labs) | 0.02 |
| Total | 50% |

The procedure to form the emulsion was the same as in Example 1. The viscosity of this product as that of a softened butter similar to that produced in Example 1. Its hardness slightly increased with refrigerated storage. No oil separation was observed after 1 week storage at 4° C.

EXAMPLE 3

Twenty eight grams (28 g) of monoglycerides derived from hydrogenated vegetable oil (Myverol 18-06 Kodak) were placed in a round-bottom 100 mL flask and melted at 120° C. Ten grams of malic acid (Sigma) were then added under stirring. The above weight ratio gives 1:1 molar ratio of malic acid to monoglycerides. Four hundred mg of p-toluenesulfonic acid catalyst were added to the reaction mixture, vacuum was applied (6-10 mm Hg) and the mixture was stirred at 120° C. for 3 hr. It became important at this point to have precise temperature control, because malic acid decomposes at 140° C. During the next 4 hours, the temperature was raised slowly to 150° C. The reaction mixture was incubated for 1 hour, then heated to 180° C. and kept at this temperature for another 15 hours. forming the polymer.

The polymer was cooled to room temperature, homogenized and thoroughly washed with methanol to remove the catalyst. The molecular weight of the resulting polymer determined by GPC was around 6,400. The product melting properties were then determined by DSC. The melting point was found to be around 48° C. Scans of a 5% (by weight) solution of the polymer in canola oil revealed an endothermic peak around 30° C. with an enthalpy of 2.7 J/g.

The polymer was then used to prepare fat spread emulsions with liquid oil stock and no structural or saturated fat. Composition of the phases and the preparation method was as described in Example 2. The resulting product was a firm stable butter-like emulsion. No oil separation was observed upon storage at 4° C. for 1 week.

EXAMPLE 4

A citrate polymer was prepared as described in Example 1. It was then used in combination with canola oil as a substitute for Crisco ® brand shortening in pie crust. Positive and negative controls were used for comparison. The following formulation was used to make the piecrusts:

| Component | Test material | % in Final Product Positive control | Negative control |
|---|---|---|---|
| Shortening (Crisco Brand) | 0 | 25.66 | 0 |
| Canola Oil | 0 | 0 | 25.66 |
| Canola Oil containing 7% polymer | 25.66 | 0 | 0 |
| Flour | 51.35 | 51.35 | 51.35 |
| Salt | 1.6 | 1.6 | 1.6 |
| Ice water | 21.39 | 21.39 | 21.39 |
| Total | 100 | 100 | 100 |

The polymer (7% by wt.) was dispersed in the canola oil and heated to approximately 100° C. The mixture was then cooled and stored at 4° C. until use. Salt, flour, and the shortening or oil were mixed together in a bowl. Water was then added to form a dough. The dough was refrigerated for 2 hours, rolled into ⅛" thick circles and baked at 445° F. for 8 minutes. Test material and positive control exhibited similar texture and flakiness, as well as similar in-mouth properties. The negative control was somewhat softer, flat and dense with poor in-mouth feel and little flakiness.

Equivalents

Those skilled in the art will recognize, or be able to ascertain using no more than routine experimentation, many equivalents to the specific embodiments of the invention described herein. Such equivalents are intended to be encompassed by the following claims.

We claim:

1. An edible food product containing an oil phase thickened with a texturing agent present in an amount sufficient to significantly increase the viscoelastic properties of the oil phase of said edible food product, said texturizing agent comprising an oil-soluble polyester having a molecular weight of at least about 2000 daltons.

2. An edible food product of claim 1 wherein the polyester comprises an alkyd polyester.

3. An edible food product of claim 2 wherein the oil phase comprises canola oil, soybean oil, sunflower oil, peanut oil, safflower oil, olive oil or corn oil.

4. An edible food product of claim 2 wherein the oil phase comprises hydrogenated vegetable oil, butter fat or cocoa butter.

5. An edible food product of claim 3 wherein the amount of polyester comprises from about 2% to about 10%, by weight, of the oil phase of said edible food product.

6. An edible food product of claim 4 wherein the amount of polyester comprises from about 2% to about 10%, by weight, of the oil phase of said edible food product.

7. An edible food product of claim 2 wherein said alkyd polyester comprises a reaction product of monoglycerides and citric acid.

8. An edible food product of claim 3 wherein the polyester comprises a naturally-occurring polymer.

9. An edible food product of claim 8 wherein the naturally occurring polymer comprises cutin.

10. An edible emulsion comprising an aqueous phase and an oil phase thickened with a texturing agent comprising an oil-soluble polyester having a molecular weight of at least about 2000 daltons.

11. An edible emulsion of claim 10 wherein the polyester comprises an alkyd polyester.

12. An edible emulsion of claim 11 wherein said alkyd polyester comprises a reaction product of monoglycerides and citric acid.

13. An edible emulsion of claim 12 where the oil phase comprises from about 20% to about 80%, by weight, of the emulsion.

14. An edible emulsion of claim 13 wherein the aqueous phase contains an aqueous-soluble gelling agent.

15. An edible emulsion of claim 14 where the aqueous-soluble gelling agent comprises gelatin, xanthan gum, gum arabic, guar gum, pectin, algin, carrageenen or cellulose derivatives.

16. An edible emulsion of claim 10 wherein the polyester comprises a naturally-occurring polymer.

17. An edible emulsion of claim 16 wherein the naturally-occurring polymer comprises cutin.

18. A fat-containing food product in which all or part of the fat is substituted with an oil phase thickened with a texturing agent present in an amount sufficient to significantly increase the viscoelastic properties of the oil phase of said edible food product, said texturizing agent comprising an oil-soluble polyester having a molecular weight of at least about 2000 daltons.

19. A fat-containing food product in which all or part of the fat is substituted with an emulsion comprising an aqueous phase and an oil phase thickened with a texturing agent comprising an oil-soluble polyester having a molecular weight of at least about 2000 daltons.

20. An edible food spread containing an emulsion comprising an aqueous phase and an oil phase thickened with a texturing agent comprising an oil-soluble polyester having a molecular weight of at least about 2000 daltons.

21. A baked food product in which all or part of the hydrogenated fat normally present is substituted with an oil phase comprising an unsaturated oil thickened with a texturing agent present in an amount sufficient to significantly increase the viscoelastic properties of the oil phase, said texturing agent comprising an oil-soluble polyester having a molecular weight of at least about 2000 daltons.

22. A baked food product in which all or a part of the hydrogenated fat normally present is substituted with an emulsion comprising an aqueous phase and an unsaturated oil thickened with a texturing agent comprising an oil-soluble polyester having a molecular weight of least about 2000 daltons.

* * * * *